Nov. 10, 1964 J. LAMONT 3,156,865
PULSE ECHO TEST SET CALIBRATION CIRCUIT AND METHOD
Filed April 20, 1960 2 Sheets-Sheet 1

INVENTORS
J. LAMONT
By S. Gundersen
ATTORNEY

INVENTOR
J. LAMONT
By S. Gundersen
ATTORNEY

3,156,865
PULSE ECHO TEST SET CALIBRATION CIRCUIT
AND METHOD
John Lamont, North Arlington, N.J., assignor to Western
Electric Company, Incorporated, New York, N.Y., a
corporation of New York
Filed Apr. 20, 1960, Ser. No. 23,462
9 Claims. (Cl. 324—58)

This invention relates to pulse echo test systems for evaluating the impedance characteristics of electromagnetic transmission media and more particularly to circuits for calibrating reference signals for the systems and for utilizing the reference signal in measurements.

In testing the impedance characteristics of electromagnetic wave transmission media, such as coaxial or video pair cable, a recurring pulse is applied to one end of the cable through a balanced hybrid coil and the resulting echo pattern is displayed on an oscilloscope screen so that echoes appear on the horizontal scale in the relative location of their sources along the cable. The balanced hybrid coil prevents transmission of the applied (input) pulse directly to the oscilloscope, keeping the strong input signal from overloading the oscilloscope when the oscilloscope sensitivity is adjusted for display of the relatively weak echoes. The magnitudes of the echoes are represented by vertical displacement of the oscilloscope trace. In order to determine the relative size of the input pulse and the resulting echo, it is necessary to establish a reference level for the input pulse and to then evaluate the echo in terms of the reference.

One previously known method of establishing the reference level is to initially open or short the cable side of the hybrid coil. The pulse normally applied to the cable is then transmitted through the hybrid coil to the vertical deflection system of the oscilloscope. With a given loss applied by an input variable attenuator, the gain control in the vertical oscilloscope amplifier is adjusted for a reference deflection. When the hybrid coil is connected to a cable under test, the magnitude of any echo may be determined by adjusting the variable attenuator to match the echo with the reference deflection. The ratio of the echo to the input pulse then equals the difference in attenuator readings.

In practical situations, the above described technique contains sources of error which may exceed permissible limits. The inaccuracy in measurement is manifested by a difference in the results obtained between the open and the shorted condition of the test leads. This may become a significant factor, for example, in the quality control of manufactured cables. In one case, for example, a deviation of one-half decibel between the open and short methods of creating the necessary unbalance in the disconnected test leads is found.

Accordingly, it is an object of the invention to provide calibrating and measuring circuitry and a method of using it in conjunction with pulse echo test systems which will eliminate the uncertainties and inaccuracies of both open and shorted hybrid coil windings in determining the calibration.

The inveniton is a new calibrate-measure circuitry and method to be used in combination with pulse echo test systems for determining the impedance characteristics of an electro-magnetic wave transmitting medium. The method and circuitry essentially provide for first applying an input pulse to an unterminated cable and measuring the ratio of the echo obtained therefrom to the input pulse by applying the cable input directly to the vertical plates of an osciiloscope. This will enable a precise measurement of the ratio of the echo pulse to the input pulse in units of decibles, or "db down" by simultaneous display on the oscilloscope screen. Then the unterminated cable is attached to the test system in the usual manner, and the test system is adjusted so that it will read that known ratio and show a signal of reference size on the system oscilloscope. Thereafter, the input pulse is diverted before it reaches the cable, and sent through a calibrate circuit where it is attenuated until it corresponds to the adjusted ratio from the unterminated cable, which is evidenced by a signal on the system oscilloscope which matches the reference signal. This calibrate circuit is now set to provide a signal which is a known intensity down from the input pulse and an evaluated reference signal is thus established against which echoes from the terminated line are compared.

Additional objects and manifestations of the invention will be clearly understood with reference to the following detailed description and drawing in which.

Figure 1:
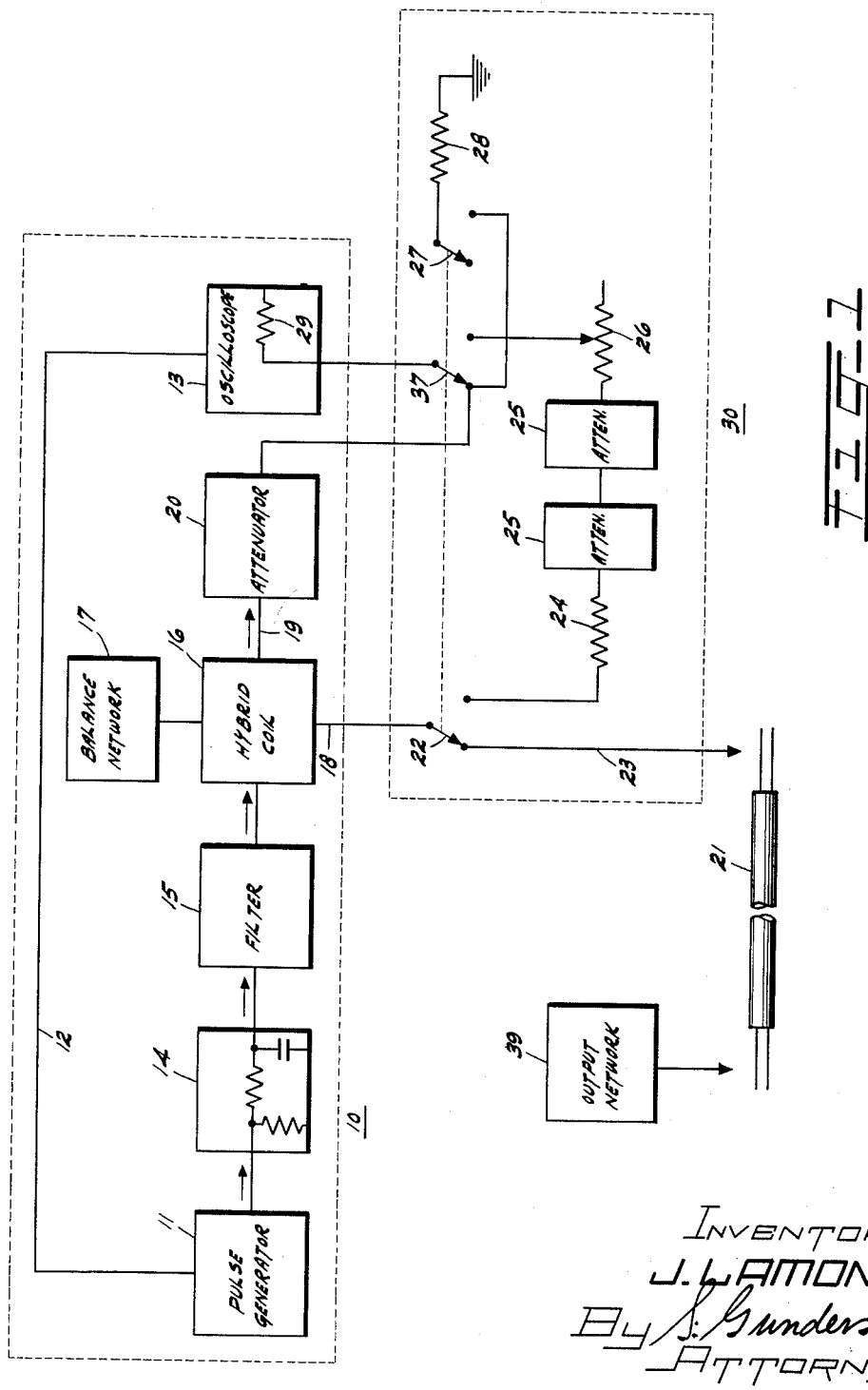
FIG. 1 is a schematic representation of a pulse echo system including a calibrate-measure system according to the invention.

Referring to FIG. 1, a pulse echo system is indicated generally by reference numeral 10. The system includes a pulse generator 11 which may be controlled by a base oscillator (not shown). The pulse generator is the source of input pulses and also controls through synchronizing line 12 the sweep frequency of the trace on the cathode oscilloscope 13 in a conventional manner. The output pulse is fed through pulse shaper 14. Additional pulse shaping is accomplished by means of low pass filter 15 which feeds a raised cosine pulse of approximately 0.25 micro-second duration to the hybrid coil 16. Balancing network 17 provides the necessary matching impedance for directing the input pulse through line 18 and directing the returning echo through line 18 into line 19 and through attenuator 20 to oscilloscope 13. When the hybrid coil 16 is balanced between cable 21 on one side and the balance network 17 on the other, the input pulse is prevented from passing directly through to the attenuator and oscilloscope 13. The input pulse and oscilloscope windings of the hybrid coil may be, for example, 75 ohms and the cable-network windings 125 ohms. The hybrid action permits the returning echoes to pass through the hybrid coil from the 125-ohm to the 75-ohm winding and on through the attenuator 20 to the oscilloscope 13.

Operated in conjunction with the pulse echo system 10 is the calibrate-measure circuit shown generally as reference numeral 30. Circuit 30 is arranged to bring the input pulse to the oscilloscope at a level that establishes the same relationship with the echoes as exists at the cable input. A switch 22 is connected to line 18 from the hybrid coil. In its first, or left-hand, position switch 22 connects line 18 through circuit segment 23 to the transmission line or cable 21 under test. An output network 39 is available to terminate line 21 with its characteristic impedance to minimize reflection.

In its second, or right-hand position switch 22 connects line 18 to a calibrate circuit segment. This circuit consists of a fixed resistance 24 and two standard attenuation pads 25 in series, each of which provides an attenuation of 25 decibels. The impedance of resistor 24 is 50 ohms, and the impedance of the attenuators 25 is 75 ohms, the sum of the impedances approximately matching the 125-ohm hybrid coil winding. In series with resistance 24 and the attenuators 25 is variable resistance 26. The adjustable contact of resistance 26 is connected to a contact of switch 37 so that switch 37 in its right-hand position connects the calibrate circuit segment to oscilloscope 13.

The left-hand contact position of switch 37 connects the output of attenuator 20 in the echo line of the hybrid coil to oscilloscope 13. A third switch 27 also makes its right-hand contact with the output of attenuator 20 and grounds that output through resistor 28 to ground. The impedance of resistor 28 is selected to approximately equal the effective terminal impedance 29 of the oscilloscope 13 and is accordingly in this case 75 ohms. Switch 27 and resistor 28 serve to provide the proper terminal impedance for hybrid coil echo line 19 when switch 37 is in its right-hand position. As a matter of convenience, switches 22, 27 and 37 may be ganged to make all of their left-hand connections and all of their right-hand connections concurrently.

The arrangement of the pulse echo circuit 10 and the calibrate-measure circuit 30 in the manner described above overcomes the disadvantages inherent in the prior art calibration of the input signal. As has been previously stated, a calibration method which either short or open circuits the input pulse line analogous to line 18 results in disadvantageous effects. A difference of several tenths of a decibel can result in readings derived from the shorted and open condition of the input leads. In addition, the setting of the balance network carried over from the previous test effects the height of the reference pulse and is another source of some tenths of a decibel variation.

These difficulties of both the open and short calibration techniques may be summed up with the assertion that there is uncertainty as to what the true echo reading actually is. The problem could, of course, be resolved by measuring the ratio of the size of the echo from an imperfection to that of the input pulse at the cable input. However, this is an impractical measurement because the difference in magnitude of the input pulse and the imperfection echo is extreme. The problem is solved more effectively by the invention in a different manner. A two-step calibration technique is used to establish a known echo as a reference standard. In the first calibration step, the pulse from the measuring circuit is applied to the cable. The plates of an oscilloscope are connected to the input of the cable. The cable is unterminated so that the resulting echo is in the same size range as the input pulse. The pulse and its echo both appear on the scope screen and their ratio is measured by an attenuator in the pulse generator.

This cable now has a known echo which can be used to calibrate any measuring circuit. (The difference between the pulse and this echo is due only to the round trip attenuation of the cable length.)

In the second calibrate step, the calibrate circuit is adjusted to give the correct reading for the known echo. The standard cable from the first step is connected to the measuring circuit. The echo attenuator, whose settings are a measure of the level of the echo, is adjusted to the value corresponding to the known level of the echo. The height of the echo is adjusted to a reference level by the oscilloscope gain control. The input pulse is switched to the calibrate circuit where it passes through an adjustable attenuator to the oscilloscope. The calibrate circuit attenuation is adjusted to give the same pulse height on the scope that the echo had been adjusted to. The measuring circuit now gives the correct reading for the known echo and will give the correct reading for any other echo.

Figure 2:
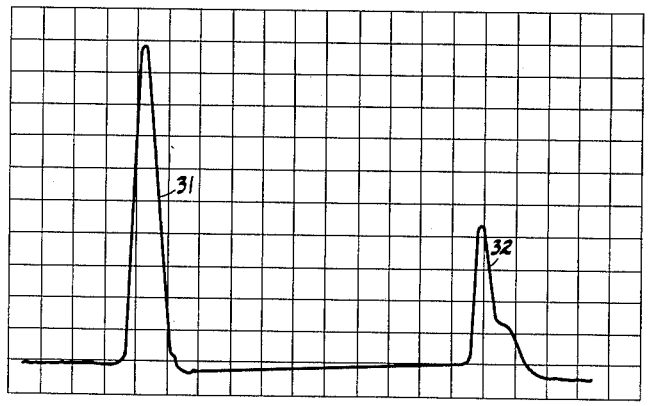
FIG. 2 is a simultaneous display oscilloscope depiction of the input pulse and echo from the unterminated cable.

Thereafter to measure any echo, the pulse is first switched to the calibrate circuit and its height on the scope adjusted to a reference value by the scope gain control. The pulse is then switched back to the cable and the echoes reach the oscilloscope through the hybrid coil and the echo attenuator. The level of the echo is measured by noting the setting of the echo attenuator required to produce the same deflection on the scope as the calibrate pulse. With the first calibration step, it is thus possible to display the input pulse and the echo from a standard cable simultaneously on the oscilloscope trace as shown in FIG. 2 where curve 31 is the input pulse, and 32, the echo. The ratio of the input and echo pulses can be determined by direct measurement on the oscilloscope face or an attenuator can be used to bring the input pulse to the size of the echo. The latter technique offers some advantages, particularly in connection with the measurement method which is discussed below. It will be realized that an open end cable echo corrected for cable attenuation will be theoretically zero decibels down from the input pulse. It should also be noted that the distance to the cable end and the imperfection locations in the cable are not involved in this calibration step as only the size relations are significant in the translation of measurements from the cable input to the oscilloscope. For this reason, a shorter cable than that eventually to be tested may be used for calibrating. The larger open echo provided by the shorter line increases calibration accuracy.

A pulse generator attenuator may be used to determine the ratio between the input pulse and the simultaneously displayed echo. This evaluated echo will be used to calibrate the measuring circuit which subsequently will be used to measure the level of echoes in the line under test. The calibrate-measure circuit and its method of use described below give unambiguous and more accurate echo readings. The input pulse is shown on the oscilloscope in its true form as it appears at the cable input undistorted by incorrect terminations of open or shorted test leads. In addition, the inventive circuitry and method permit the input pulse to be referred to at any time during the actual test without the necessity of changing attenuator settings or lead-in connections.

The operation of the calibrate-measure circuit will now be described in detail. To establish an echo with a known level, the input of a cable is connected as indicated above directly to the vertical plates of the oscilloscope to preserve the balance condition. Cable 21 is connected to line 23 with the output network 39 disconnected, thus leaving the cable in its unterminated, open condition. Switch 22 then is set in its left-hand position, connecting the hybrid coil through lines 18 and 23 to the cable. When the set is turned on, both the input pulse and the open end echo will be simultaneously displayed on the oscilloscope screen. The bases of the input pulse and the echo are brought to a common horizontal line and the pulses are moved to the same horizontal position. The height of the echo pulse is noted and the input pulse is reduced in magnitude by an attenuator, which may be in the pulse generator circuit, to match that echo value. The open echo is then down from the input pulse by the amount of attenuation inserted in the pulse input circuit. This is the value which will be used in adjusting the calibrate circuit.

After the open echo has been measured relative to the input pulse as described above, the oscilloscope and other connections are placed in their normal testing condition by removing the cable input leads from the vertical plates of the oscilloscope. The next step is to obtain an echo in the vicinity of the maximum echo permitted for the cable under test. For example, the specification for one type of video pair cable requires that the echoes returned from imperfections should be 38 or more decibels down from the input pulse. Assuming, for purposes of illustration, that the unterminated echo was found to be 8.0 decibels below the input pulse, the desirable reference echo is 30 decibels further down than the 8-decibel echo. One way of obtaining the 38-decibel down echo is to set attenuator 20, 8 decibels down, adjust the pulse to a reference line, remove 30 decibels of attenuation which would make the setting 38 decibels down, and adjust for an echo of reference line height. As a matter of convenience, the dials of attenuator 20 may be marked zero at the 50-decibel level and to give increasing increments as the attenuation is reduced. The attenuation level is then most conveniently read in decibels down from 50.

Figure 3:
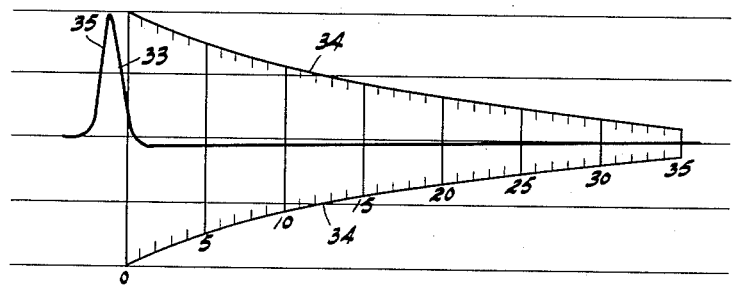
FIGS. 3 and 4 are oscilloscope portrayals of the reference signal and echoes from the terminated cable.
Figure 4:
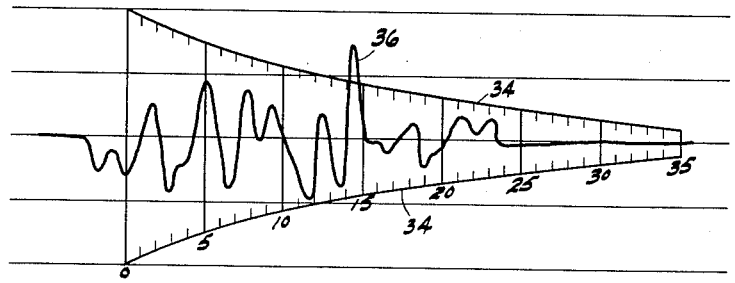

An improvement in this procedure eliminates the attenuation error in the 30-decibel shift. The 30-decibel shift is made by means of standard pads as follows. The 8 decibels down level is set up by inserting 30 decibels of standard pads (not shown) in series with the attenuator 20 and setting the attenuator 20 to read 38 decibels down. With the unterminated cable connected for test, the scope gain is adjusted to bring the open terminal echo to a one-inch high reference line. The output network 24 is then connected to cable 21 to eliminate the open echo. The 30-decibel standard pads are then removed and the output network adjusted to obtain a pulse peak at the one-inch reference line. This will be a 38-decibel down echo, 30 decibels below the 8-decibel echo. Switches 22, 27 and 37 are moved to the right-hand position and potentiometer 26 is adjusted to bring the peak of the pulse to the reference line. With this adjustment the calibrate circuit is ready for use in testing. With switch 22 in its right-hand position, the calibrated input pulse 35 is at the scope reference line 33, FIG. 3. With switch 22 in its left or measure position, the cable input echo is at the reference line and attenuator 20 has reduced the input echo 38 decibels down. The attenuator reading is then the actual value of the echo relative to the input pulse. Thereafter, for calibration, switch 22 is placed on the right-hand calibrate position and the oscilloscope gain is adjusted to bring the pulse to the reference line height. Switch 22 is then turned to its left-hand or measure position and the balance network 17 and the output network 39 adjusted for proper matching. The attenuator 20 is then set to the value required to bring the echo to be measured to the curved reference line of graticule 34, FIGS. 3 and 4. Graticule 34, positioned on the oscilloscope face, compensates for the normal attenuation of the echo in the cable by the curved reference line which indicates the 38-decibel allowable limit and also provides a distance scale for measuring the location of the echo reflection point relative to the cable input. In FIG. 4, echo 36 indicates a return echo from an imperfection approximately 1400 feet from the input end. The echo adjusted to discount the normal line attenuation is less than 38 decibels down from the input pulse, thus indicating that the cable is unacceptable.

Since the attenuator error over the normal range of measurements is usually negligible, it is unnecessary that the derived maximum reference echo be exactly 38 decibels down (the acceptable maximum echo). Indeed it may be convenient, when standard pads are inserted in series with the attenuator 20, to set the attenuator at the sum of the pad attenuation value and the reference echo attenuation down from the input pulse. Thus, for example, if the known reference echo is 6.4 decibels down, the attenuator is set at 36.4 decibels down when 30 decibels of pads are inserted in series. Similarly, if the reference echo is 6.4 decibels down and the standard pads 29.8 decibels, the attenuator is set at 29.8 plus 6.4 or 36.2 decibels down.

The above described method and arrangement are to be understood as being merely illustrative of the invention. Obviously, the use of an untermined line is not an absolute requirement for calibration since a line having any gross impedance discontinuity could be used if an echo pulse of sufficient magnitude results. Other arrangements embodying the principles of the invention and falling within its spirit and scope may be readily devised by those skilled in the art.

What is claimed is:

1. In a pulse echo test set including a pulse source, a hybrid coil having first and second output windings, a first attenuator, the first output winding being coupled to the first attenuator, and an oscilloscope for measuring impedance characteristics of transmission lines; a calibrate-measure circuit for establishing the magnitude of echoes relative to an input pulse, said calibrate circuit comprising a switching means and a second attenuator, said switching means being operable to, selectively, either connect the second output winding to a line under test, or, at another position, connect the second output winding to the second attenuator and the second attenuator to the oscilloscope.

2. In a pulse echo test system, a method of calibrating and measuring for determining the impedance discontinuity characteristics of a wave transmission line which comprises the steps of: applying input pulses to an unterminated line to provide a simultaneous display of an input pulse and its echo pulse on the screen of an oscilloscope and measuring the ratio of the said input and echo pulses, setting a first attenuator, to which the said echo pulses are applied, in accordance with said ratio, adjusting the gain of a calibrate-measure oscilloscope coupled to said first attenuator to bring the echo pulses to a reference value of deflection on the oscilloscope screen, applying diverted input pulses through a second attenuator to the input of the said calibrate-measure oscilloscope, adjusting the second attenuator unitl the pulses displayed on the calibrate-measure oscilloscope screen are equal in magnitude to the reference deflection value, and thereafter applying unknown echo pulses from a transmission line to said first attenuator to determine the ratio of the echo pulse magnitude to that of the input pulse.

3. In a pulse echo test system, a method of calibrating and measuring for determining the impedance discontinuity characteristics of a wave transmission line which comprises the steps of: applying input pulses to an unterminated line to provide a known echo by simultaneous display of an input pulse and its echo pulse on the screen of an oscilloscope and measuring the ratio of the said input and echo pulses, directing the said echo pulses through a hybrid coil to a first attenuator, deleting attenuation equal to the said radio from said first attenuator, adjusting the gain of a calibrate-measure oscilloscope coupled to said first attenuator to bring the echo pulses to a reference value of deflection on the oscilloscope screen, diverting the input pulses before they reach the transmission line and sending them through a second attenuator to the input of the said calibrate-measure oscilloscope, adjusting the second attenuator until the pulses displayed on the calibrate-measure oscilloscope screen are equal in magnitude to the reference deflection value, and thereafter applying unknown echo pulses from a transmission line to said first attenuator, and deleting attenuation from said first attenuator until the calibrate-measure oscilloscope reads the reference deflection value, thus obtaining the ratio of the unknown echo pulse magnitude to that of the input pulse.

4. In a device according to claim 1 wherein the second attenuator comprises attenuator pads of 75 ohms impedance and 50-decibel attenuation serially connected with a resistance such that the sum of the resistance and pad impedance is approximately equal to the effective impedance of the hybrid coil to provide an impedance load on the hybrid coil similar to that provided by the cable.

5. In a device according to claim 1 further including a circuit segment comprising a matching impedance equal to the termination impedance of the oscilloscope, the matching impedance being grounded at one end, the switching means being further operable to, at said another position, also connect the oscilloscope side of the first attenuator to the ungrounded end of the matching impedance, and to disconnect the oscilloscope from the first attenuator.

6. In a pulse-echo system having a hybrid coil for directing pulses from a pulse source to a reflecting object and pulse echoes through an echo circuit from the object to an oscilloscope input, a calibrate-measure circuit which comprises a first transmission segment serially connectable between the hybrid coil and the object, a second transmission segment serially connectable between the hybrid coil and the oscilloscope input, the second segment having a fixed resistance, an attenuator, and a variable resistance connected in series, the combined impedance of the fixed resistance and the attenuator approximately matching the impedance of the hybrid coil, and a circuit section including a grounded impedance element connectable to terminate the hybrid coil echo circuit, the impedance of the element being approximately equal to the impedance of the oscilloscope.

7. A calibrate-measure circuit according to claim 6 which includes a common line portion, the common line portion being connectable between the first transmission segment and the hybrid coil and connectable between the second transmission segment and the hybrid coil, a first switching means serially terminating the common portion for switching the common portion from the first segment to the second segment, an echo line portion connectable at one end to the hybrid coil echo circuit, and a second switching means for switching the oscilloscope input from the echo line portion to the second transmission segment and for coincidentally connecting the ungrounded end of the circuit section to the echo line portion.

8. In a pulse echo system having a hybrid coil including a first output winding for directing pulses to a reflecting object and a second output winding for directing echoes from the object through an attenuator to an oscilloscope, a calibrate-measure circuit which comprises a conducting line serially connected to the first output winding of the hybrid coil, a first switch serially connected to the conducting line, the switch having first and second connecting positions, a transmission segment serially connectable with the object, the first switch position connecting the transmission segment serially to the hybrid coil, a circuit section connected to the second connecting position having a fixed resistance, an attenuator, and a variable resistance in series, the combined impedance of the fixed resistance and attenuator approximately matching the impedance of the hybrid coil to provide an impedance loaded on the hybrid coil similar to that provided by the cable, a second switch in series with the input to the oscilloscope and having first and second connecting positions, the first position of the second switch serially connecting the oscilloscope input to the echo line from the hybrid coil, and the second position of the second switch serially connecting the circuit section output to the oscilloscope.

9. A calibrate-measure circuit according to claim 8 which further comprises a grounded impedance element with an impedance approximately equal to that of the oscilloscope, a third switch serially connected with the ungrounded end of the impedance element, the third switch being operable to serially connect the impedance element to the echo line attenuator when the second switch is in the second position, and the first and second switches being ganged to concurrently connect their first and their second positions.

References Cited in the file of this patent

UNITED STATES PATENTS

| | | |
|---|---|---|
| 2,267,430 | Slezskinsky | Dec. 23, 1941 |
| 2,345,932 | Gould | Apr. 4, 1944 |
| 2,705,744 | Bourseau et al. | Apr. 5, 1955 |
| 2,793,343 | Wagner | May 21, 1957 |
| 2,800,627 | Oudin et al. | July 23, 1957 |
| 2,960,653 | Linlor et al. | Nov. 15, 1960 |

OTHER REFERENCES

Pulse Echo Techniques on Telephone and Television Facilities, AIEE Technical Paper 47–86, Dec. 1946, pp. 1–14.

Lebert: Pulse Testing of Coaxial Cables, Bell Laboratories Record, vol. XXIX, No. 4, April 1951; pp. 153–157.

UNITED STATES PATENT OFFICE
CERTIFICATE OF CORRECTION

Patent No. 3,156,865　　　　　　　　　　　　　　　November 10, 1964

John Lamont

It is hereby certified that error appears in the above numbered patent requiring correction and that the said Letters Patent should read as corrected below.

Column 1, line 61, for "inveniton" read -- invention --; column 5, line 56, for "untermined" read -- unterminated --; column 6, line 32, for "radio" read -- ratio --.

Signed and sealed this 24th day of August 1965.

(SEAL)
Attest:

ERNEST W. SWIDER　　　　　　　　　　　　　　　EDWARD J. BRENNER
Attesting Officer　　　　　　　　　　　　　　　Commissioner of Patents